(12) United States Patent
Kang et al.

(10) Patent No.: US 7,707,340 B2
(45) Date of Patent: *Apr. 27, 2010

(54) BUS SYSTEM AND METHOD OF BURST CYCLE CONVERSION

(75) Inventors: Shin-Chan Kang, Seoul (KR);
Jae-Young Lee, Yongin-si (KR);
Kyo-Keun Ku, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/219,659

(22) Filed: Jul. 25, 2008

(65) Prior Publication Data

US 2008/0288688 A1    Nov. 20, 2008

Related U.S. Application Data

(63) Continuation of application No. 11/476,839, filed on Jun. 29, 2006, now Pat. No. 7,418,535.

(30) Foreign Application Priority Data

Jul. 1, 2005    (KR) .............................. 2005-59147

(51) Int. Cl.
*G06F 13/00* (2006.01)
*G06F 13/38* (2006.01)
*G06F 12/00* (2006.01)
*G06F 13/42* (2006.01)

(52) U.S. Cl. .................... 710/110; 710/35; 710/240
(58) Field of Classification Search ............. 710/113, 710/110, 36, 240
See application file for complete search history.

(56) References Cited

U.S. PATENT DOCUMENTS

| 5,398,244 | A | 3/1995 | Mathews et al. |
| 5,530,661 | A | 6/1996 | Garbe et al. |
| 5,740,461 | A | 4/1998 | Jaggar |
| 6,247,101 | B1 | 6/2001 | Settles |
| 6,717,941 | B1 | 4/2004 | Dwork |
| 6,775,727 | B2 * | 8/2004 | Moyer ........................ 710/113 |
| 6,775,732 | B2 | 8/2004 | Jahnke et al. |
| 6,868,459 | B1 * | 3/2005 | Stuber ......................... 710/35 |
| 6,907,478 | B2 * | 6/2005 | Li et al. ........................ 710/33 |
| 7,475,168 | B2 * | 1/2009 | Weber et al. .................. 710/35 |
| 7,543,088 | B2 * | 6/2009 | Weber et al. .................. 710/35 |
| 7,543,093 | B2 * | 6/2009 | Chou et al. ................... 710/105 |
| 2004/0205267 | A1 * | 10/2004 | Holm et al. ................... 710/35 |

* cited by examiner

*Primary Examiner*—Glenn A Auve
*Assistant Examiner*—Ryan M Stiglic
(74) *Attorney, Agent, or Firm*—Harness, Dickey & Pierce, P.L.C.

(57) ABSTRACT

A bus system, which may prevent data from being incorrectly transferred when an early termination occurs during a burst mode, may include a bus, for example, an advanced high-performance bus (AHB), at least one bus master device, a bus arbiter and at least one transfer mode selection circuit. The at least one bus master device may generate a burst cycle control signal, a transfer start signal and a bus control request signal for requesting control of the bus, and may be activated in response to a bus control grant signal, so as to exchange data via the bus. The bus arbiter may generate the bus control grant signal in response to the bus control request signal and provide the bus control grant signal to the bus master device. The at least one transfer mode selection circuit may convert a burst mode into a single mode to generate a selection signal, when the bus control grant signal is deactivated before a burst mode operation is completed.

20 Claims, 7 Drawing Sheets

BUS SYSTEM AND METHOD OF BURST CYCLE CONVERSION

PRIORITY STATEMENT

This application is a continuation of application Ser. No. 11/476,839, filed Jun. 29, 2006 now U.S. Pat. No. 7,418,535, which claims the benefit under 35 U.S.C. §119(a) of Korean Patent Application No. 2005-59147 filed on Jul. 1, 2005, the contents of which are herein incorporated by reference in its entirety

BACKGROUND OF THE INVENTION

Example embodiments of present invention relate to a bus system and a method of arbitrating the same. For example, example embodiments of the present invention may relate to an Advanced High-performance Bus (AHB) system having a plurality of masters, that is capable of reducing or preventing system failure when an early termination occurs in a burst mode.

In complicated computer systems, a plurality of processors and various peripheral devices may be used for exchanging data between integrated chips (ICs) or between the ICs and an external device. Some computer systems use various, separate buses for transferring data. Such multiple bus systems require bus controller(s) for collision-free communication between the separate buses. For such a purpose, a microcontroller has been used. The microcontroller may provide a bus arbitration function to decide which device has control of a bus at a given time.

A standard AMBA interface may include two main buses, i.e., an advanced high-performance bus (AHB) and an advanced peripheral bus (APB). The AHB may be a main memory bus, which may be connected to a random access memory (RAM) and an external memory controller.

FIG. 1 is a block diagram illustrating a prior art AHB system including a master, a slave and an arbiter.

Referring to FIG. 1, in the AHB system, signals flow back and forth among at least are AHB master which requests control of an AHB 100, an AHB arbiter 110 which executes arbitration decisions, and at east one AHB slave 210 which is selected by the master. The AHB arbiter 110, the AHB master 200 and the AHB slave 210 may receive a reset signal (HRESET) 222, and/or a clock signal (HCLOCK) 223. The AHB master 200 may activate a bus control request signal (HBUSREQX) 231 so as to request a control of the AHB 100 from the AHB arbiter 110, and may receive a bus access grant signal (HGRANTX) 232 from the AHB arbiter 110 to be granted access to the AHB 100. After the grant, the AHB master 200 may lock an arbitration decision according to a clock signal HLOCKX 233, and may send an address signal (ADDRESS) 205 to an AHB decoder 111. The AHB decoder 111 may activate a selection signal 112 to be provided to the AHB slave 210.

Mutual interactions between the AHB master 200 and the AHB slave 210 may be carried out by control signals (CONTROL) 213, and may be acknowledged by a response signal HRESP 211 and a ready signal HREADY 212. Data for a read operation or for a write operation may be transferred from the at least one AHB master 200 via the AHB 100 to the at least AHB slave 210. The AHB slave(s) 210 may provide data to the AHB 100 through an HRDATA bus 206, and may receive data from the AHB 100 through an HWDATA bus 207. Similarly, the AHB master(s) 200 may provide data to the AHB 100 through an HWDATA bus 209, and receive data from the AHB 100 through an HRDATA bus 208. At any given time, one AHB master 200 may be activated. The activated AHB master 200 may select only one AHB slave 210 to execute the read operation or the write operation.

According to the AMBA Specification Rev. 2.0, a memory controller that supports early termination is required to monitor addresses and control signals, for each cycle, in a burst mode. A memory controller with early termination support may be more complex and/or more unreliable, when operated at a higher speed than memory controllers without early termination support.

Therefore, memory controllers, which may be slave devices, tend not to support early termination for improving speed. In addition, in most systems-on-chips (SOCs), support of early termination is excluded from master devices, for example, a direct memory access (DMA) controller, a liquid crystal display (LCD) controller, and the like, except for ARM9 processors.

In a system including an ARM9 processor from ARM, Ltd., master devices, for example, a DMA, etc. and slave devices, for example, a memory controller, the master devices may have different priorities related to usage of the AHB. In such cases, the AHB arbiter may arbitrate access to the AHB between the master devices according to the priorities. Thus, whenever accessing the AHB slave devices, e.g., the memory controller, the master devices may send a request signal for controlling the AHB to the AHB arbiter and receive a grant signal for controlling the AHB, so as to access the memory controller via the AHB.

When the ARM processor, after receiving the grant signal, executes a burst mode operation, the AHB arbiter may be requested from a master device having a priority higher than that of the ARM processor. The AHB arbiter may revoke the grant signal previously granted to the ARM processor, and give the grant to the master device having a higher priority. The control of the AHB may possibly be handed over to the master device having a higher priority even before the ARM processor in the burst mode operation can finish reading or writing data. Such an incident is referred to as an early termination. A memory controller, without early termination support, may fetch data from an external memory, for example, a dynamic random access memory (DRAM), according to the number of the bursts in the first cycle of the burst mode operation, and may transfer the fetched data not to the ARM processor, but to the master device having a higher priority in the second cycle of the burst mode operation without taking into account the fact that the control of the AHB has been handed over. As a result, the early termination may cause a failure of data transfer.

SUMMARY OF THE INVENTION

Example embodiments of the present invention provide a bus system having a plurality of masters, the bus system being capable of preventing data transfer failure when an early termination occurs in a burst mode.

Other example embodiments of the present invention provide a method of arbitrating a bus system having a plurality of masters, the bus system being capable of preventing data transfer failure when an early termination occurs in a burst mode.

In an example embodiment of the present invention, a bus system may include a bus, for example, an advanced high-performance bus (AHB), at least one bus master device, a bus arbiter and/or at least one transfer mode selection circuit.

The at least one bus master device may generate a burst cycle control signal, a transfer start signal and a bus control request signal for requesting control of the AHB, and may be activated in response to a bus control grant signal, so as to exchange data via the AHB. The bus arbiter may generate the bus control grant signal in response to the bus control request signal and provide the bus control grant signal to the bus master device. The at least one transfer mode selection circuit may convert an operation mode of the bus master device from a burst mode to a single mode to generate a selection signal, when the bus control grant signal is deactivated before a burst mode operation is completed.

In an additional example embodiment, the bus system may further include a slave device that exchanges the data with the at least one bus master device via the bus in the operation mode selected according to the selection signal.

In a further example embodiment, the at least one transfer mode selection circuit may include a detection circuit and a multiplexer. The detection circuit may detect conditions in which the transfer start signal indicates a non-sequence and the bus control grant signal is deactivated, so as to generate a detection signal. The multiplexer may convert the burst cycle control signal to a single mode signal in response to the detection signal so as to generate the selection signal according to the conversion.

In a still further example embodiment, the at least one transfer mode selection circuit may include first, second and/or third AND gates. The first AND gate may execute a logical AND operation of the first bit of the burst cycle control signal and the bus control grant signal to generate a first bit of the selection signal. The second AND gate may execute a logical AND operation of the second bit of the burst cycle control signal and the bus control grant signal to generate a second bit of the selection signal. The third AND gate may execute a logical AND operation of the third bit of the burst cycle control signal and the bus control grant signal to generate a third bit of the selection signal.

In another example embodiment of the present invention, a bus system may include a bus, for example, an advanced high-performance bus (AHB), a plurality of bus master devices, a bus arbiter, a plurality of transfer mode selection circuits and/or a first selection circuit.

The bus master devices may respectively generate burst cycle control signals, transfer start signals and bus control request signals for requesting control of the AHB, and may be respectively activated in response to a corresponding bus control grant signal, so as to respectively exchange data via the AHB. The bus arbiter may execute an arbitration decision with respect to the bus control request signals to generate the bus control grant signal and provide the bus control grant signal to one of the bus master devices. Each of the transfer mode selection circuits may convert an operation mode of the corresponding bus master device from a burst mode to a single mode to generate a selection signal, when the bus control grant signal is deactivated before a burst mode operation is completed. The first selection circuit may select one of the selection signals to generate a first slave control signal.

In still another example embodiment of the present invention, a bus arbitration method may include generating a burst cycle control signal, a transfer start signal and a bus control request signal, generating a bus control grant signal in response to the bus control request signal to provide the bus control grant signal to a corresponding bus master device, accessing the AHB in response to the bus control grant signal by the bus master device, and/or converting an operation mode of the bus master device from a burst mode to a single mode to then generate a slave control signal, when the bus control grant signal is deactivated before the burst mode operation is completed.

BRIEF DESCRIPTION OF THE DRAWINGS

The above and other features and advantages of the present invention will become more apparent by describing in detail example embodiments thereof with reference to the accompanying drawings, in which.

DESCRIPTION OF EXAMPLE EMBODIMENTS

Figure 1:
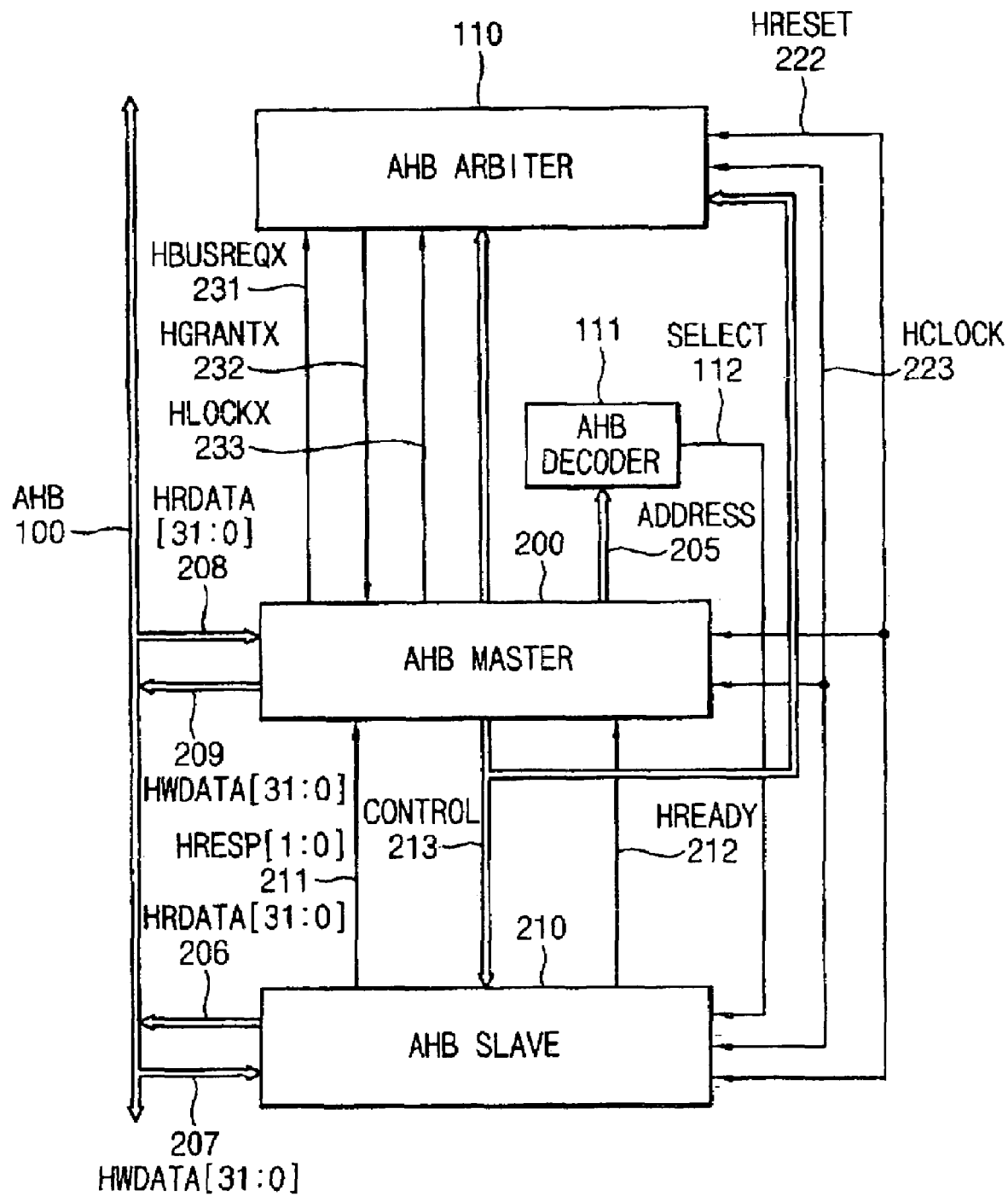
FIG. 1 is a block diagram illustrating a prior art advanced high-performance bus (AHB) system including a master, a slave and an arbiter.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions and/or sections, these elements, components, regions and/or sections should not be limited by these terms. These terms are only used to distinguish one element, component, region, layer or section from another region or section. Thus, a first element, component, region or section discussed below could be termed a second element, component, region or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
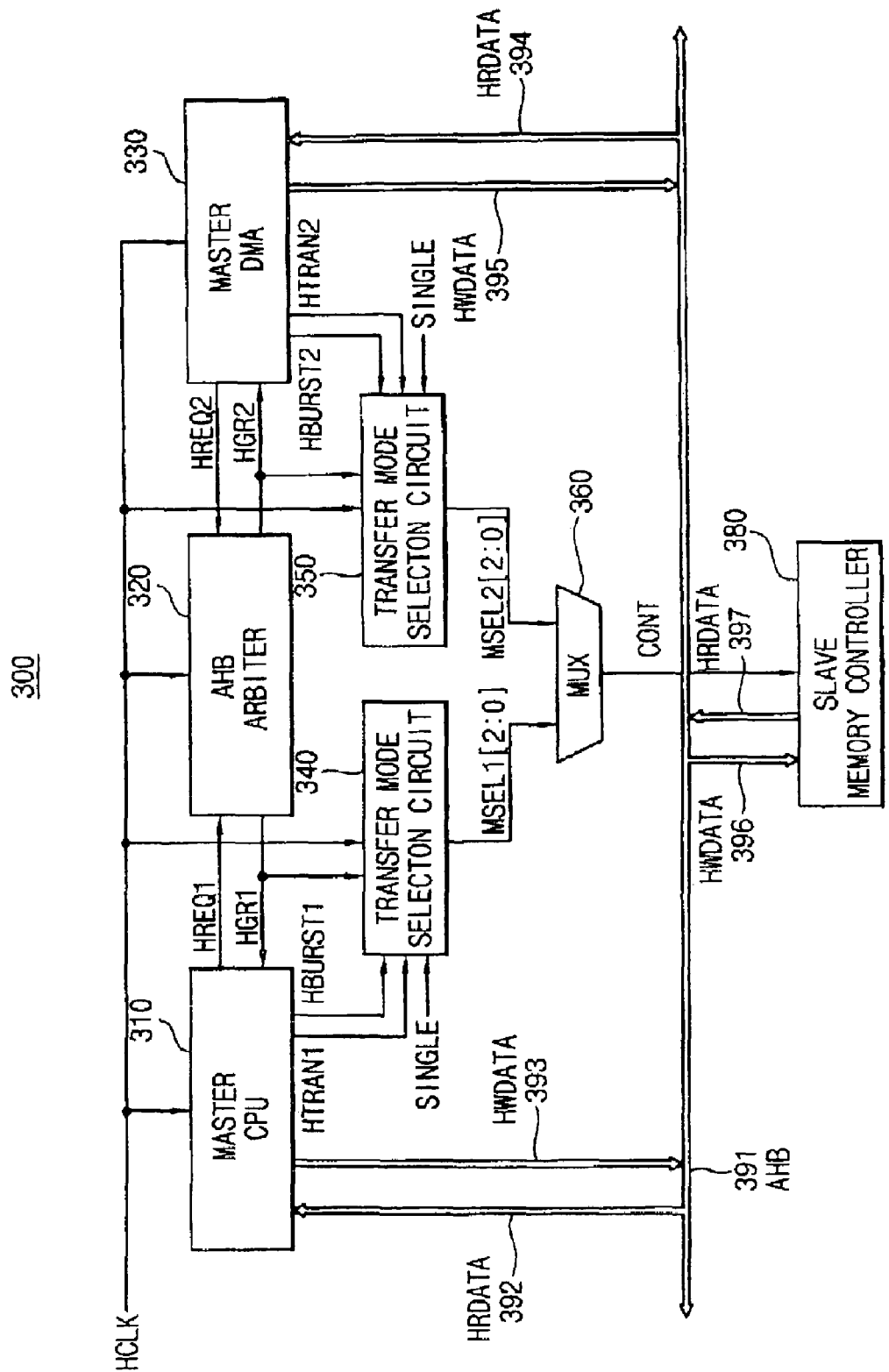
FIG. 2 is a block diagram illustrating an AHB system according to example embodiments of the invention.

FIG. 2 is a block diagram illustrating an advanced high-performance bus (AHB) system according to example embodiments of the invention.

Referring to FIG. 2, the AHB system 300 may include an AHB 391, bus master devices, e.g., a central processing unit (CPU) 310 and a direct memory access (DMA) controller 330, a bus arbiter 320 and/or transfer mode selection circuits 340 and 350. The AHB system 300 may further include a slave device 380 coupled to the AHB 391.

A system clock signal HCLK may be applied to the bus master devices 310 and 330, the bus arbiter 320 and the transfer mode selection circuits 340 and 350. The bus master device 310 may receive data from the AHB 391 via an HRDATA bus 392 and send data to the AHB 391 via an HWDATA bus 393. Similarly, the bus master device 330 may receive data from the AHB 391 via an HRDATA bus 394 and send data to the AHB 391 via an HWDATA bus 395. The AHB slave device 380 may send data to the AHB 391 via an HRDATA bus 397 and receives data from the AHB 391 via an HWDATA bus 396.

The bus master device 310 may be, for example, an ARM9 processor or other device, which supports early termination. The bus master device 330 may be, for example, a DMA controller or other device, which does not support early termination. The bus master device 330 may have a priority higher than that of the bus master device 310 with respect to control of the AHB 391.

The bus master device 310 may generate a burst cycle control signal HBURST1, a transfer start signal HTRAN1 and a bus control request signal HREQ1 for requesting the control of the AHB 391. The bus master device 310 may also receive a bus control grant signal HGR1 from the bus arbiter 320 and exchange data via the AHB 391.

The bus master device 330 may generate a burst cycle control signal HBURST2, a transfer start signal HTRAN2 and a bus control request signal HREQ2 for requesting the control of the AHB 391. The bus master device 330 may also receive a bus control grant signal HGR2 from the bus arbiter 320 and exchange data via the AHB 391.

The bus arbiter 320 may execute the arbitration decision of the bus control request signals HREQ1 and HREQ2 and activate one of the bus control grant signals HGR1 and HGR2 to enable the corresponding bus master device at a given time.

The transfer mode selection circuit 340 may convert the burst cycle control signal HBURST1 to a single mode signal in response to the transfer start signal HTRAN1 and the bus control grant signal HGR1, to generate a selection signal MSEL1. The transfer mode selection circuit 340 may also receive a single signal SINGLE, with a bit structure of, for example, [0,0,0], to convert the burst cycle control signal HBURST1 to the single mode signal.

The transfer mode selection circuit 350 may convert the burst cycle control signal HBURST2 to the single mode signal in response to the transfer start signal HTRAN2 and the bus control grant signal HGR2, to generate a selection signal MSEL2. The transfer mode selection circuit 340 may also receive the single signal SINGLE, with a bit structure of, for example, [0,0,0], to convert the burst cycle control signal HBURST2 to the single mode signal.

When the bus control grant signals HGR1 and/or HGR2 are deactivated before the corresponding burst mode operations are completed, the transfer mode selection circuits 340 and 350 may force the corresponding burst mode into a single mode.

The AHB system 300 may include a selection circuit 360 that selects one of the selection signals MSEL1 and MSEL2 to generate a slave control signal CONT. The selection circuit 360 may be composed of a multiplexer MUX as shown in FIG. 2.

Example operation of the example embodiment in FIG. 2 is described as below.

When the bus master device 330, having a higher priority with respect to the AHB 391, requests control of the AHB 391 during a burst mode operation of the bus master device 310, the bus arbiter 320 may deactivate the bus control grant signal HGR1, previously granted to the bus master device 310, and activate the bus control grant signal HGR2 for the bus master device 330.

The slave memory controller 380, however, may transfer fetched data at the second cycle, not to the bus master device 310, but to the bus master device 330 having a higher priority, because the data is fetched without considering the bus control change.

The bus system according to the example embodiments of the invention in FIG. 2 may include the transfer mode selection circuits 340 and 350, which force conversion of the bus master devices 310 and 330 from the burst mode into the single mode when the bus control grant signals HGR1 and HGR2 are deactivated before the completion of the burst mode operation, so as to prevent data from being transferred incorrectly.

The multiplexer 360 may select one of the selection signals MSEL1 and MSEL2 output from transfer mode selection circuits 340 and 350, to generate a selected selection signal as the slave control signal CON. Because the slave control signal CON is the single mode signal, the slave device 380 recognizes the data to be transferred as a single mode data. Therefore, a transfer failure may be prevented between the master devices and the slave device.

Figure 3:
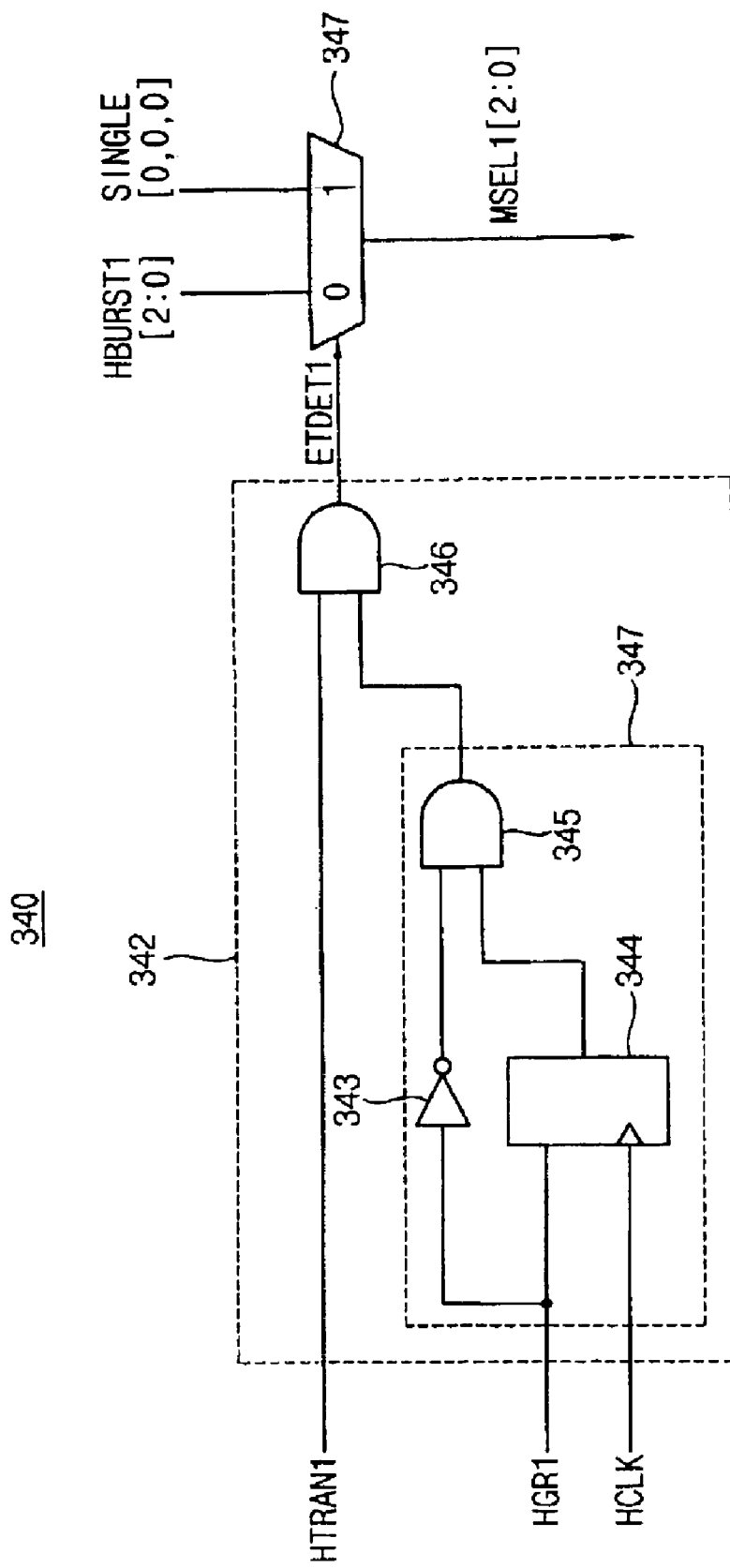
FIGS. 3 and 4 are example circuit diagrams illustrating transfer mode selection circuits included in the AHB system in FIG. 2, respectively.
Figure 4:
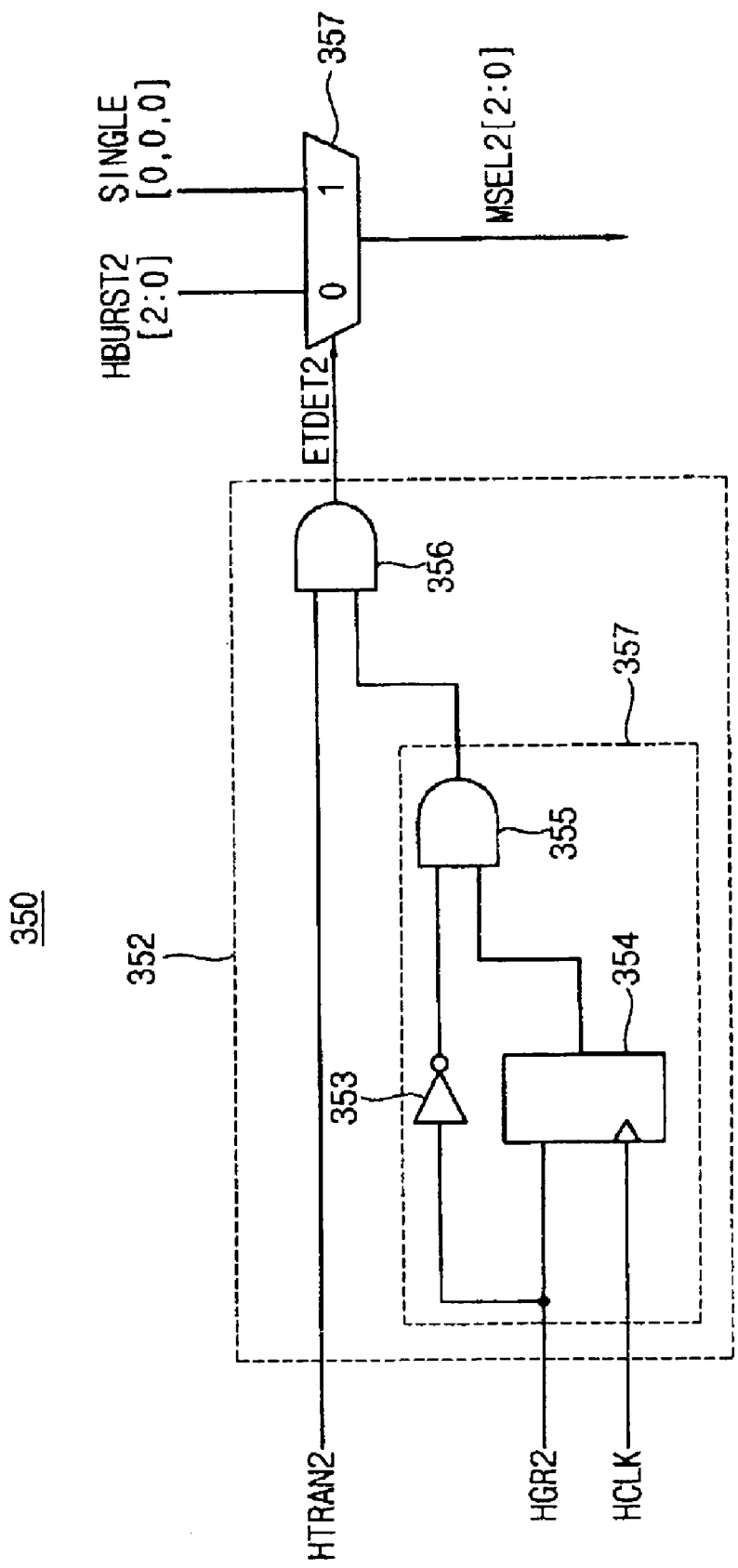

FIGS. 3 and 4 are circuit diagrams illustrating transfer mode selection circuits included in the AHB system in FIG. 2.

Referring to FIG. 3, the transfer mode selection circuit 340 may include a detection circuit 342 and a multiplexer 347. The detection circuit 342 may generate a detection signal ETDET1 that is activated when the transfer start signal HTRAN1 indicates a non-sequence and the bus control grant signal HGR1 is deactivated. The multiplexer 347 may convert the burst cycle control signal HBURST1 into the single mode signal SINGLE in response to the activation of the detection signal ETDET1 to generate the selection signal MSEL1. The burst cycle control signal HBURST1, the single mode signal SINGLE and the selection signal MSEL1 may have a 3-bit structure. According to the AMBA Specification Rev. 2.0, the burst cycle control signal HBURST1 is represented as [1,1,1], and the single mode signal as [0,0,0]. When the burst cycle control signal HBURST1 is converted into the bit structure of the single mode signal, the bus master device 310 in FIG. 2 is no longer in the burst mode and the transferred data is recognized not as burst mode data, but single mode data.

The detection circuit 342 may include a pulse generator 347 and an AND gate 346. The pulse generator 347 may generate a pulse signal, which is activated during substantially one period of the system clock HCLK, in response to the system clock HCLK and the bus control grant signal HGR1.

The AND gate 346 may execute a logical AND operation of an output signal of the pulse generator 347 and the transfer start signal HTRAN1.

The pulse generator 347 may include an inverter 343, a flip-flop 344 and/or an AND gate 345. The inverter 343 may invert the bus control grant signal HGR1. The flip-flop 344 may temporarily store the bus control grant signal HGR1 and output the bus control signal HGR1 at a front or leading edge of the system clock HCLK. The AND gate 345 may execute a logical AND operation of an output of the inverter 343 and the output of the flip-flop 344.

Referring to FIG. 4, the transfer mode selection circuit 350 may include a detection circuit 352 and a multiplexer 357. The detection circuit 352 may generate a detection signal ETDET2 that is activated when the transfer start signal HTRAN2 indicates a non-sequence and the bus control grant signal HGR2 is deactivated. The multiplexer 357 may convert the burst cycle control signal HBURST2 into the single mode signal SINGLE in response to the activation of the detection signal ETDET2 to generate the selection signal MSEL2.

The burst cycle control signal HBURST2, the single mode signal SINGLE and the selection signal MSEL2 may have a 3-bit structure. According to the AMBA Specification Rev 2.0, the burst cycle control signal HBURST2 is represented as [1,1,1] and the single mode signal as [0,0,0]. When the burst cycle control signal HBURST2 is converted into the bit structure of the single mode signal, the bus master device 330 in FIG. 2 is no longer in the burst mode and the transferred data is recognized as not a burst mode data, but a single mode data.

The detection circuit 352 may include a pulse generator 357 and an AND gate 356. The pulse generator 357 may generate a pulse signal, which is activated during substantially one period of the system clock HCLK, in response to the system clock HCLK and the bus control grant signal HGR2. The AND gate 356 may execute a logical AND operation of an output signal of the pulse generator 357 and the transfer start signal HTRAN2.

The pulse generator 357 may include an inverter 353, a flip-flop 354 and/or an AND gate 355. The inverter 353 may invert the bus control grant signal HGR2. The flip-flop 354 may temporarily store the bus control grant signal HGR2 and output the bus control signal HGR2 at a front or leading edge of the system clock HCLK. The AND gate 355 may execute a logical AND operation of an output of the inverter 353 and the output of the flip-flop 354.

Figure 5:
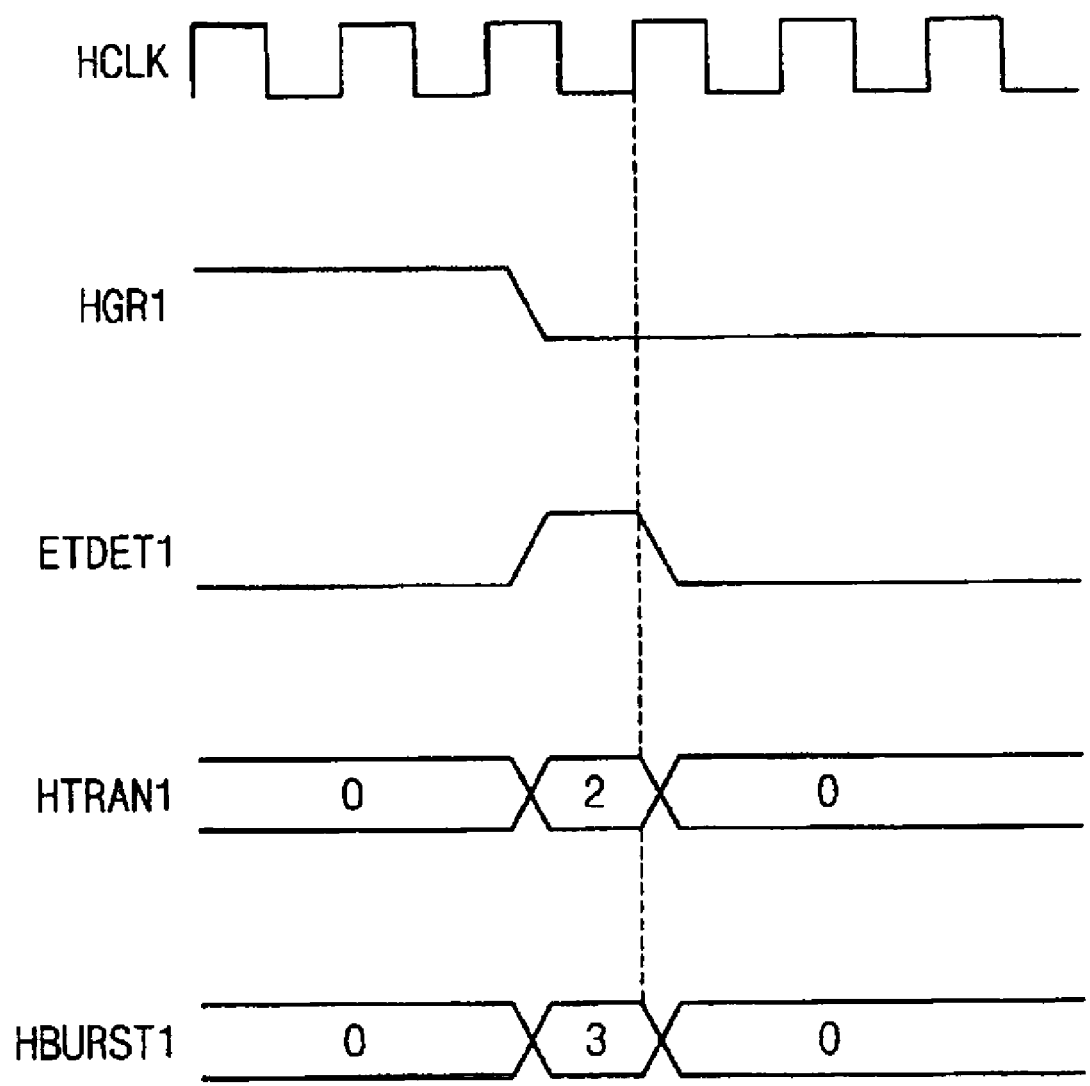
FIG. 5 is an example timing diagram for the example first transfer mode selection circuit in FIG. 3.

FIG. 5 is an example timing diagram for a transfer mode selection circuit in accordance with an example embodiment of the present invention.

Operation of the transfer mode selection circuits 340 and 350 are described as below, referring to FIGS. 3 through 5. Referring to FIG. 5, because the bus control grant signal HGR1 is turned from a logic 'high' to a logic 'low', the detection signal ETDET1 is turned from a logic 'low' to a logic 'high' at a front or leading edge of the system clock signal HCLK, is kept as a logic 'high' during substantially one period of the system clock signal HCLK and then is turned to a logic 'low' at the next front or leading edge of the system clock signal HCLK. Eventually, the detection signal. ETDET1 is a pulse signal that maintains logic 'high' during substantially one period of the system clock signal HCLK.

At the falling edge of the detection signal ETDET1, the burst cycle control signal HBURST1 is converted from a value 3 to a value 0 and the burst start signal HTRAN1 is converted from a value 2 to a value 0. According to the AMBA Specification Rev. 2.0, a burst cycle control signal HBURST1 having a value 3 indicates the burst mode, and a burst cycle control signal HBURST1 having a value 0 indicates the single mode. A transfer start signal HTRAN1 having a value 2 indicates the non-sequence mode, and a transfer start signal HTRAN1 having a value 0 indicates the sequence mode. Therefore, in response to the deactivation of the bus control grant signal HGR1, the burst cycle control signal HBURST1 may be converted from the burst mode into the single mode and the transfer start signal HTRAN1 may be converted from the non-sequence mode to the sequence mode.

Figure 6:
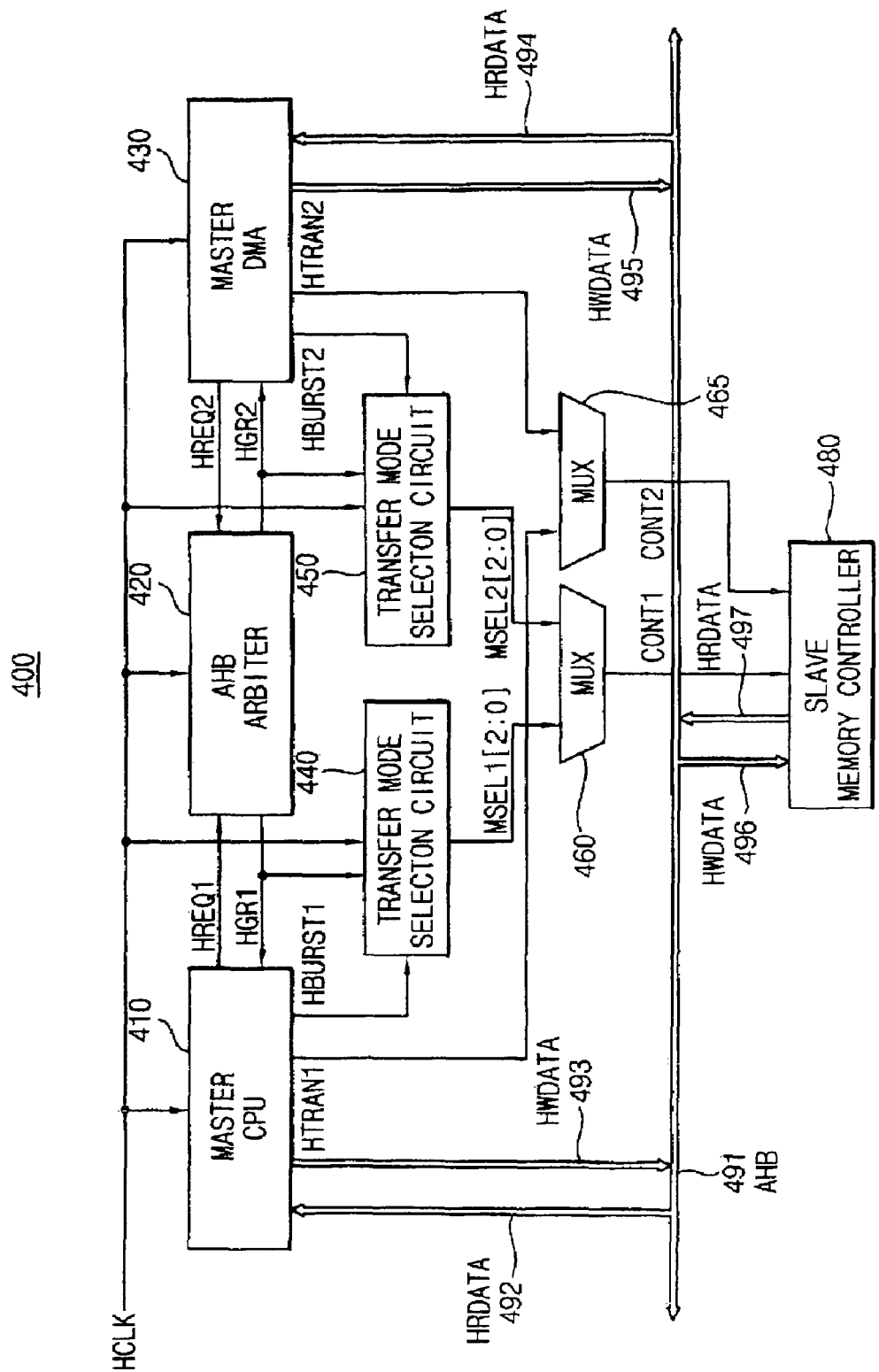
FIG. 6 is a block diagram illustrating an AHB system according to example embodiments of the invention.

FIG. 6 is a block diagram illustrating an AHB system according to other example embodiments of the invention. Referring to FIG. 6, the AHB system 400 may include an AHB 491, bus master devices 410 and 430, a burst arbiter 420 and transfer mode selection circuits 440 and 450. The AHB system 400 may further include a slave device 480 coupled to the AHB 491. The system clock signal HCLK may be applied to the bus master devices 410 and 430, the bus arbiter 420 and the transfer mode selection circuits 440 and 450. The bus master device 410 may receive data from the AHB 491 via the HRDATA bus 492, and send data to the AHB 491 via the HWDATA bus 493. Similarly, the bus master device 430 may receive data from the AHB 491 via the HRDATA bus 494, and send data to the AHB 491 via the HWDATA bus 495. The slave device 480 may send data to the AHB 491 via the HRDATA bus 497, and receive data from the AHB 491 via the HWDATA bus 496.

The bus master device 410 may be, for example, an ARM9 processor, which supports early termination. The bus master device 430 may be, for example, a DMA controller, which does not support early termination. The bus master device 430 may have a priority higher than that of the bus master device 410 with respect to the control of the AHB 491.

The bus master device 410 may generate a burst cycle control signal HBURST1, a transfer start signal HTRAN1 and/or a bus control request signal HREQ1 for requesting the control of the AHB 491. The bus master device 410 also may receive a bus control grant signal HGR1 from the bus arbiter 420 and exchange data via the AHB 491.

The bus master device 430 may generate a burst cycle control signal HBURST2, a transfer start signal HTRAN2 and/or a bus control request signal HREQ2 for requesting the control of the AHB 491. The bus master device 430 may also receive a bus control grant signal HGR2 from the bus arbiter 420 and exchange data via the AHB 491.

The bus arbiter 420 may execute the arbitration decision of the bus control request signals HREQ1 and HREQ2 and activate one of the bus control grant signals HGR1 and HGR2 to enable the corresponding bus master device at a given time.

The transfer mode selection circuit 440 may convert the burst cycle control signal HBURST1 to a single mode signal in response to the transfer start signal HTRAN1 and the bus control grant signal HGR1, to generate a selection signal MSEL1.

The transfer mode selection circuit 450 may convert the burst cycle control signal HBURST2 to the single mode signal in response to the transfer start signal HTRAN2 and the bus control grant signal HGR2, to generate a selection signal MSEL2.

When the bus control grant signals HGR1 and/or HGR2 are deactivated before the corresponding burst mode operations are completed, the transfer mode selection circuits 440 and 450 may force the corresponding burst mode into a single mode.

The AHB system 400 may include a selection circuit 460 that selects one of the selection signals MSEL1 and MSEL2 to generate a slave control signal CONT. The selection circuit 460 may be composed of a multiplexer MUX as shown in FIG. 6. The AHB system 400 may further include a selection circuit 465 that selects one of the transfer start signals HTRAN1 and HTRAN2 to generate a slave control signal CONT2.

Example operation of the example embodiment in FIG. 6 is described as below.

The transfer mode selection circuits 440 and 450 may generate selection signals MSEL1 and MSEL2 using the burst cycle control signals HBURST1 and HBURST2 and the bus control grant signals HGR1 and HGR2, and are different from the transfer mode selection circuits 340 and 350 in FIG. 2. The AHB system 400 may include the selection circuit 465 that selects one of the transfer start signals HTRAN1 and HTRAN2 to generate the slave control signal CONT2, and is different from the AHB system in FIG. 2.

Figure 7:
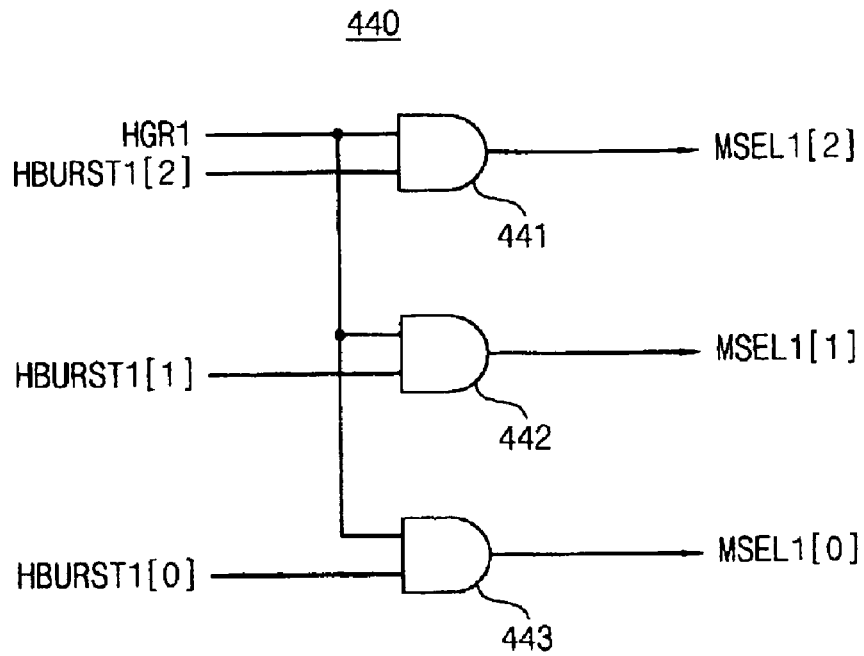
FIGS. 7 and 8 are example circuit diagrams illustrating transfer mode selection circuits included in the AHB system in FIG. 6, respectively.
Figure 8:
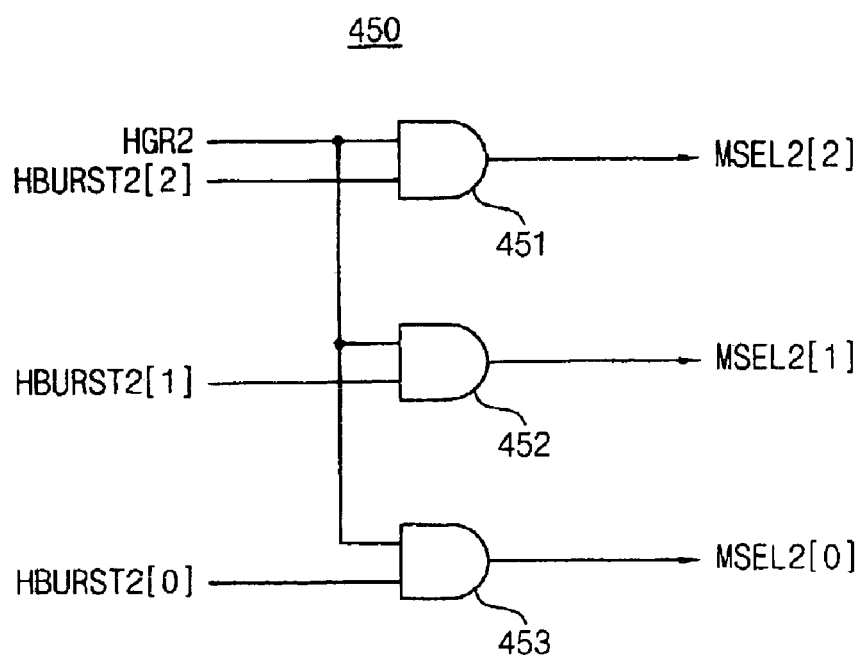

FIGS. 7, and 8 are example circuit diagrams illustrating transfer mode selection circuits included in the AHB system in FIG. 6.

Referring to FIG. 7, the transfer mode selection circuit 440 may include AND gates 441, 442 and 443. The AND gate 443 execute a logical AND operation of the bus control grant signal HGR1 and a first bit HBURST1[0] of the burst cycle control signal HBURST1 to generate a first bit MSEL1[0] of the selection signal MSEL1. The AND gate 442 executes a logical AND operation of the bus control grant signal HGR1 and a second bit HBURST1[1] of the burst cycle control signal HBURST1 to generate a second bit MSEL1[1] of the selection signal MSEL1. The AND gate 441 executes a logical AND operation of the bus control grant signal HGR1 and a third bit HBURST1[2] of the burst cycle control signal HBURST1 to generate a third bit MSEL1[2] of the selection signal MSEL1.

The operation of the transfer mode selection circuit 440 of FIG. 7 is described as below.

The transfer mode selection circuit 440 may receive the burst cycle control signal HBURST1 and the bus control grant signal HGR1 to generate the selection signal MSEL1, which is a single mode signal, at the deactivation of the bus control grant signal HGR1. With the deactivation of the bus control grant signal HGR1, each output of the AND gates 441, 442 and 443 is set to a logic 'low' regardless of each bit of the burst cycle control signal HBURST1. The transfer mode selection circuit 440 executes logical AND operations of the respective bits of the burst cycle control signal HBURST1 and the bus control grant signal HGR1 having a logic 'low', to set all of the bits of the selection signal MSEL1 to a logic 'low' and to convert the selection signal MSEL1 to the single mode signal.

Therefore, when the bus control grant signal HGR1 is deactivated before the burst mode operation finishes, the burst cycle control signal HBURST1 from the bus master device 410 is converted to the single mode signal passing through the transfer mode selection circuit 440 to be provided to the slave device 480. The burst cycle control signal HBURST1, which has values of the single mode signal, indicates that the bus master device does not execute the burst mode operation, and the transferred data is recognized not as burst mode data, but as single mode data.

Referring to FIG. 8, the transfer mode selection circuit 450 may include AND gates 451, 452 and 453. The AND gate 453 executes a logical AND operation of the bus control grant signal HGR2 and a first bit HBURST2[0] of the burst cycle control signal HBURST2 to generate a first bit MSEL2[0] of the selection signal MSEL1. The AND gate 452 executes a logical AND operation of the bus control grant signal HGR2 and a second bit HBURST2[1] of the burst cycle control signal HBURST2 to generate a second bit MSEL2[1] of the selection signal MSEL2. The AND gate 451 executes a logical AND operation of the bus control grant signal HGR2 and a third bit HBURST2[2] of the burst cycle control signal HBURST2 to generate a third bit MSEL2[2] of the selection signal MSEL2.

The operation of the transfer mode selection circuit 450 of FIG. 8 is described as below.

The transfer mode selection circuit 450 may receive the burst cycle control signal HBURST2 and the bus control grant signal HGR2 to generate the selection signal MSEL2, which is a single mode signal, at the deactivation of the bus control grant signal HGR2. With the deactivation of the bus control grant signal HGR2, each output of the AND gates 451, 452 and 453 is set into a logic 'low' regardless of each bit of the burst cycle control signal HBURST2. The transfer mode selection circuit 450 executes logical AND operations of the respective bits of the burst cycle control signal HBURST2 and the bus control grant signal HGR2 having a logic 'low', to set all of the bits of the selection signal MSEL2 to a logic 'low' and to convert the selection signal MSEL2 to the single mode signal.

Therefore, when the bus control grant signal HGR2 is deactivated before the burst mode operation finishes, the burst cycle control signal HBURST2 from the bus master device 430 is converted to the single mode signal passing through the transfer mode selection circuit 450 to be provided to the slave device 480. The burst cycle control signal HBURST2, which has values of the single mode signal, indicates that the bus master device does not execute the burst mode operation, and the transferred data is recognized not as burst mode data, but as single mode data.

Early termination may occur during a burst mode operation of a first bus master device, when a second bus master device having a higher priority than the first bus master device requests the control of the bus to a bus arbiter. As described above, the bus system according to example embodiments of the invention may prevent data from being incorrectly transferred when the early termination occurs, converting the operation mode of the first bus master device from the burst mode to the single mode. The bus system according to example embodiments of the invention may include one or more transfer mode selection circuits for converting the burst cycle control signal into the single mode signal to be provided to a slave device.

Although example embodiments of the present invention discussed refer to advanced high-performance bus (AHB) systems and AHB buses, the teachings of example embodiment of the present invention may be applied to any other bus or bus system. Additional details of AHB systems and AHB buses may be found in U.S. Pat. No. 5,740,461 and U.S. Pat. No. 6,775,732, the entire contents of each of which are hereby incorporated by reference in their entirety.

The foregoing is illustrative of the present invention and is not to be construed as limiting thereof. Although a few example embodiments of this invention have been described, those skilled in the art will readily appreciate that many modifications are possible in the example embodiments without materially departing from the novel teachings and advantages of this invention. Accordingly, all such modifications are intended to be included within the scope of this invention as defined in the claims. In the claims, means plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A burst cycle conversion method comprising:
   generating a burst cycle control signal and a bus control grant signal;
   receiving data using a bus in an operation mode indicated by the burst cycle control signal; and
   converting an operation mode indicated by the burst cycle control signal from a burst mode to a single mode, when the bus control grant signal is deactivated before a burst mode operation is completed.

2. The method of claim 1, further comprising:
   sending the converted burst cycle control signal to the slave device as a slave control signal.

3. The method of claim 1, further comprising:
   generating a slave control signal using the converted burst cycle control signal; and
   sending the slave control signal to a slave device.

4. The method of claim 1, wherein converting the operation mode comprises:
   generating a single mode signal; and
   selecting between the single mode signal and the burst cycle control signal generated in a master device.

5. The method of claim 4, wherein selecting is determined in response to a transfer start signal and the bus control grant signal.

6. The method of claim 5, wherein the single mode signal is selected when the transfer start signal indicates a non-sequence and the bus control grant signal is deactivated.

7. A burst cycle conversion method comprising:
   generating a system clock signal, a burst cycle control signal and a bus control grant signal;
   receiving data using a bus in an operation mode indicated by the burst cycle control signal; and
   converting an operation mode indicated by the burst cycle control signal from a burst mode to a single mode directly after substantially one period of the system clock signal, when the bus control grant signal is deactivated before a burst mode operation is completed.

8. The method of claim 7, converting the operation mode comprises:
   generating a single mode signal; and
   selecting between the single mode signal and the burst cycle control signal generated in a master device.

9. The method of claim 8, wherein the selecting is determined in response to a transfer start signal and the bus control grant signal.

10. The method of claim 9, wherein the single mode signal is selected when the transfer start signal indicates a non-sequence and the bus control grant signal is deactivated.

11. A bus system, comprising:
    a bus for transferring data;
    a bus master device that generates a burst cycle control signal and is activated to access the bus in response to a bus control grant signal;
    a bus arbiter that generates the bus control grant signal and provides the bus control grant signal to the bus master device; and
    a transfer mode selection circuit that converts an operation mode indicated by the burst cycle control signal from a burst mode to a single mode, when the bus control grant signal is deactivated before a burst mode operation is completed.

12. The bus system of claim 11, wherein the transfer mode selection circuit sends the converted burst cycle control signal to the slave device as a slave control signal.

13. The bus system of claim 11, wherein the transfer mode selection circuit
    generates a single mode signal; and
    selects between the burst cycle control signal generated in the bus master device and the single mode signal.

14. The bus system of claim 11, wherein the transfer mode selection circuit generates a slave control signal using the converted burst cycle control signal and sends the slave control signal to a bus slave device.

15. The bus system of claim 14, wherein the selection is determined in response to a transfer start signal and the bus control grant signal.

16. The method bus system of claim 15, wherein the single mode signal is selected when the transfer start signal indicates a non-sequence and the bus control grant signal is deactivated.

17. A bus system comprising:
    a bus for transferring data in accordance with a system clock;
    a bus master device that generates a burst cycle control signal and is activated to access the bus in response to a bus control grant signal;
    a bus arbiter that generates the bus control grant signal and provides the bus control grant signal to the bus master device; and
    a transfer mode selection circuit that converts an operation mode indicated by the burst cycle control signal from a burst mode to a single mode directly after substantially one period of the system clock signal, when the bus control grant signal is deactivated before a burst mode operation is completed.

18. The bus system of claim 17, wherein the transfer mode selection circuit
    generates a single mode signal; and
    selects between the burst cycle control signal generated in the bus master device and the single mode signal.

19. The bus system of claim 18, wherein the selection is determined in response to a transfer start signal and the bus control grant signal.

20. The bus system of claim 19, wherein the single mode signal is selected when the transfer start signal indicates a non-sequence and the bus control grant signal is deactivated.

* * * * *